(12) United States Patent
Kono et al.

(10) Patent No.: US 6,365,846 B1
(45) Date of Patent: Apr. 2, 2002

(54) COMBINATION WEIGHING APPARATUS WITH IMPROVED FLOW OF ARTICLES

(75) Inventors: Katsuaki Kono; Yukio Nakagawa, both of Shiga; Yasushi Yamaguchi, Kyoto, all of (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/557,485

(22) Filed: Apr. 24, 2000

(30) Foreign Application Priority Data

Apr. 26, 1999 (JP) .......................................... 11-118090

(51) Int. Cl.$^7$ .......................................... G01G 19/387
(52) U.S. Cl. .................................................. 177/25.18
(58) Field of Search ...................................... 177/25.18

(56) References Cited

U.S. PATENT DOCUMENTS

| 4,467,880 A | 8/1984 | Minamida et al. ........ 177/25.18 |
| 4,678,046 A | 7/1987 | Mosher .................... 177/25.18 |
| 5,258,580 A | 11/1993 | Bergholt .................. 177/25.18 |

FOREIGN PATENT DOCUMENTS

| EP | 0725263 | 8/1996 | | |
| JP | 406229816 A | * 8/1994 | .............. | 177/25.18 |

OTHER PUBLICATIONS

Abstract of JA 04–128105 Apr. 28, 1992.

* cited by examiner

*Primary Examiner*—Randy W. Gibson
(74) *Attorney, Agent, or Firm*—Hogan & Hartson, LLP

(57) ABSTRACT

The present invention relates to a combination weighing apparatus for selecting a combination of some of weighing hoppers (6i) accommodating therein articles that have been supplied thereto, which combination results in a combination calculated value (Wc) of measured weights of the articles (M) contained in some of the weighing hoppers (6i) forming the combination, falling within a predetermined combination tolerance, and for subsequently discharging the articles (M) in the selected weighing hoppers (6i). In accordance with a condition of a flow of the articles (M) on a falling route downstream of the combination weighing apparatus (1), discharge timing for discharging the articles (M) from the hoppers (6i) is automatically changed among the hoppers (6i). It is thereby possible to promptly detect abnormality in the flow of the articles and to maintain the high operativity and productivity (yield) of the combination weighing apparatus (1).

14 Claims, 9 Drawing Sheets

Fig.3B

MEASUREMENT HISTORY STORAGE 13a

|  | COMBINATION CALCULATED VALUE Wc | POST-DISCHARGE MEASURED VALUE Ws |
|---|---|---|
| (n) TIMES PRECEDING | 100.3 | 100.1 |
| ⋮ | ⋮ | ⋮ |
| 3 TIMES PRECEDING | 100.5 | 95.0 |
| 2 TIMES PRECEDING | 100.1 |  |
| PREVIOUS | 100.4 |  |

→ COINCIDENCE

→ SHORTAGE

Fig.3C

CLASSIFIED ITEM STORAGE 13c

| ITEM | DISCHARGE PATTERN NO. |
|---|---|
| POTATO CHIPS A | SIMULTANEOUS DISCHARGE (0) |
| PATATO CHIPS B | STAGGERED DISCHARGE (1) |
| ⋮ | ⋮ |

SIMULTANEOUS DISCHARGE PATTERN (0)

STAGGERED DISCHARGE PATTERN (1) (20msec)

STAGGERED DISCHARGE PATTERN (2) (40msec)

STAGGERED DISCHARGE PATTERN (3)

STAGGERED DISCHARGE PATTERN (4) ($\Delta T = (m-1) \cdot dT$)

Fig. 7A

NECESSARY PROCESSING CAPABILITY STORAGE 13d

| ITEM | NECESSARY PROCESSING CAPABILITY (NUMBER/MINUTE) |
|---|---|
| POTATO CHIPS A | 60 |
| POTATO CHIPS B | 80 |
| POTATO CHIPS C | 100 |
| ⋮ | ⋮ |

Fig. 7B

MAXIMUM PROCESSING CAPABILITY STORAGE 13e

| DISCHARGE PATTERN No. | MAXIMUM PROCESSING CAPABILITY (NUMBER/MINUTE) |
|---|---|
| SIMULTANEOUS DISCHARGE (0) | 120 |
| STAGGERED DISCHARGE PATTERN 3 (8) | 90 |
| STAGGERED DISCHARGE PATTERN 4 (4) | 70 |

COMBINATION WEIGHING APPARATUS WITH IMPROVED FLOW OF ARTICLES

BACKGROUND OF THE INVENTION

1. Field of the Invention

The present invention relates to a combination weighing apparatus with an improved flow of articles.

2. Description of the Prior Art

Such a combination weighing apparatus as shown in FIG. 2 has hitherto been well known in the art. Referring to FIG. 2, articles M falling by gravity onto a central portion of a dispensing feeder 2 are supplied into a plurality of weighing hoppers 6$i$ through a corresponding number of supply troughs 3$i$ by way of associated pool hoppers 4$i$. The weighing hoppers 6$i$ are each provided with a weight detector 7$i$ for detecting the weight of the articles M supplied into the corresponding weighing hopper 6$i$. When a combination of weights of the articles M detected respectively by the weight detectors 7$i$ attains a target weight or an approximate target weight close to the target weight, the articles M contained in some of the weighing hoppers 6$i$ that have been selected in the combination are discharged from those selected weighing hoppers 6$i$ collectively onto a collecting and discharging chute 9 and are then discharged downwards towards a next processing station.

Referring to FIG. 1, quantities of articles M successively discharged from a combination weighing apparatus 1 and then falling onto a chute 203 are successively packaged by a bagging and packaging machine 200. While the articles M falling from above are filled into a tubular film F, the bagging and packaging machine 200 fuses (seals) and then cuts an upper end F1 of the film F positioned above the articles M, to thereby continuously package products M1. The products M1 thus packaged are transported to a weight checker 300 which checks whether or not the weight of the articles M fall within a predetermined range.

In the above-stated system, if the articles M are bulky such as potato chips, they may interfere with one another at a passage-tapered portion A1 of a funnel-like chute 203, the flow of the articles M become slower or they sometimes form a bridge and completely clog. Besides, since this system operates at high speed, large amounts of articles M accumulate in a short period of time if the articles M begin clogging. It takes a lot of time and labor to remove the large amounts of accumulated articles M and to restart the system, with the result that system operativity disadvantageously deteriorates.

It is, therefore, an object of the present invention to promptly detect abnormality in the flow of articles and to maintain the high operativity and productivity (yield) of a combination weighing apparatus.

SUMMARY OF THE INVENTION

To this end, a combination weighing apparatus according to one aspect of the present invention is of a design wherein a combination of some of weighing hoppers accommodating therein articles that have been supplied thereto, which combination results in a combination calculated value of measured weights of the articles contained in some of the weighing hoppers forming the combination, falling within a predetermined combination tolerance, is selected and the articles in the selected weighing hoppers are subsequently discharged therefrom. This combination weighing apparatus is featured in that a timing for discharging the articles from the hopper is adapted to be automatically changed for at least one of hoppers in accordance with a condition of a flow of the articles on a falling route downstream of the combination weighing apparatus so that virtually no clogging of the articles occurs.

According to one aspect of the present invention, if there is a likelihood of the articles being clogged, such likelihood is determined, and then a simultaneous discharge is changed to a staggered discharge or the time differences among discharge timings of the hoppers is changed, thereby turning a condition in which the contents are likely to be clogged into a condition in which virtually no clogging of the contents occurs. In this way, the discharge timing for discharging the articles from the hopper is adapted to be automatically changed for at least one of hoppers in accordance with the condition of the flow of articles. Thus, it is possible to prevent the articles from completely clogging on the downstream route. Accordingly, it is possible to maintain the operativity of the apparatus high.

Furthermore, if discharge timing is stored for each product type, it is possible to maintain high operativity for each product.

Moreover, if discharge timing pattern is selected from among preset, stored patterns, it is possible to prevent the processing capability from being lower than the necessary processing capability.

A combination weighing apparatus according to another aspect of the present invention is of a design wherein a combination of some of weighing hoppers accommodating therein articles that have been supplied thereto, which combination results in a combination calculated value of measured weights of the articles contained in some of the weighing hoppers forming the combination, falling within a predetermined combination tolerance, is selected and the articles in the selected weighing hoppers are subsequently discharged therefrom. This combination weighing apparatus is featured in that a timing for discharging the articles from the hopper is adapted to be automatically changed for at least one of hoppers in accordance with a command from an apparatus different from the combination weighing apparatus so that virtually no clogging of the articles occurs.

According to another aspect of the present invention, if there is a likelihood of the articles being clogged, a simultaneous discharge is changed to a staggered discharge or the time differences among discharge timings of the hoppers is changed in response to a command from the difference apparatus, thereby turning a condition in which the contents are likely to be clogged into a condition in which virtually no clogging of the contents occurs.

In the present invention, the term "a flow of articles" means a flow of articles from the time the articles are discharged from the hoppers of the weighing apparatus until they are filled into bags or the like.

The term "automatically change" means change without keyboard manipulation by an operator. According to the present invention, therefore, discharge timing is changed in response to a change command from flow state detection means or the other apparatus.

Manners for making "change of discharge timing" include respective manners in which the simultaneous discharge is changed to the staggered discharge, the time difference of staggered discharge is changed, and the number of hoppers or groups of hoppers having time differences is changed.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 3B is a diagram showing contents stored in a measurement history storage;

FIG. 3C is a diagram showing contents stored in a storage for storing a discharge pattern for each product type;

FIG. 7A is a diagram showing the contents stored in a storage for storing the relationship between article names and processing capabilities;

FIG. 7B is a diagram showing the contents stored in a storage for storing the relationship between patterns and processing capabilities.

DETAILED DESCRIPTION OF THE EMBODIMENTS

One embodiment according to the present invention will be described hereinafter with reference to the accompanying drawings.

First, the outline of a weighing, packaging and inspecting system to which the present invention is applied will be described.

Figure 1:
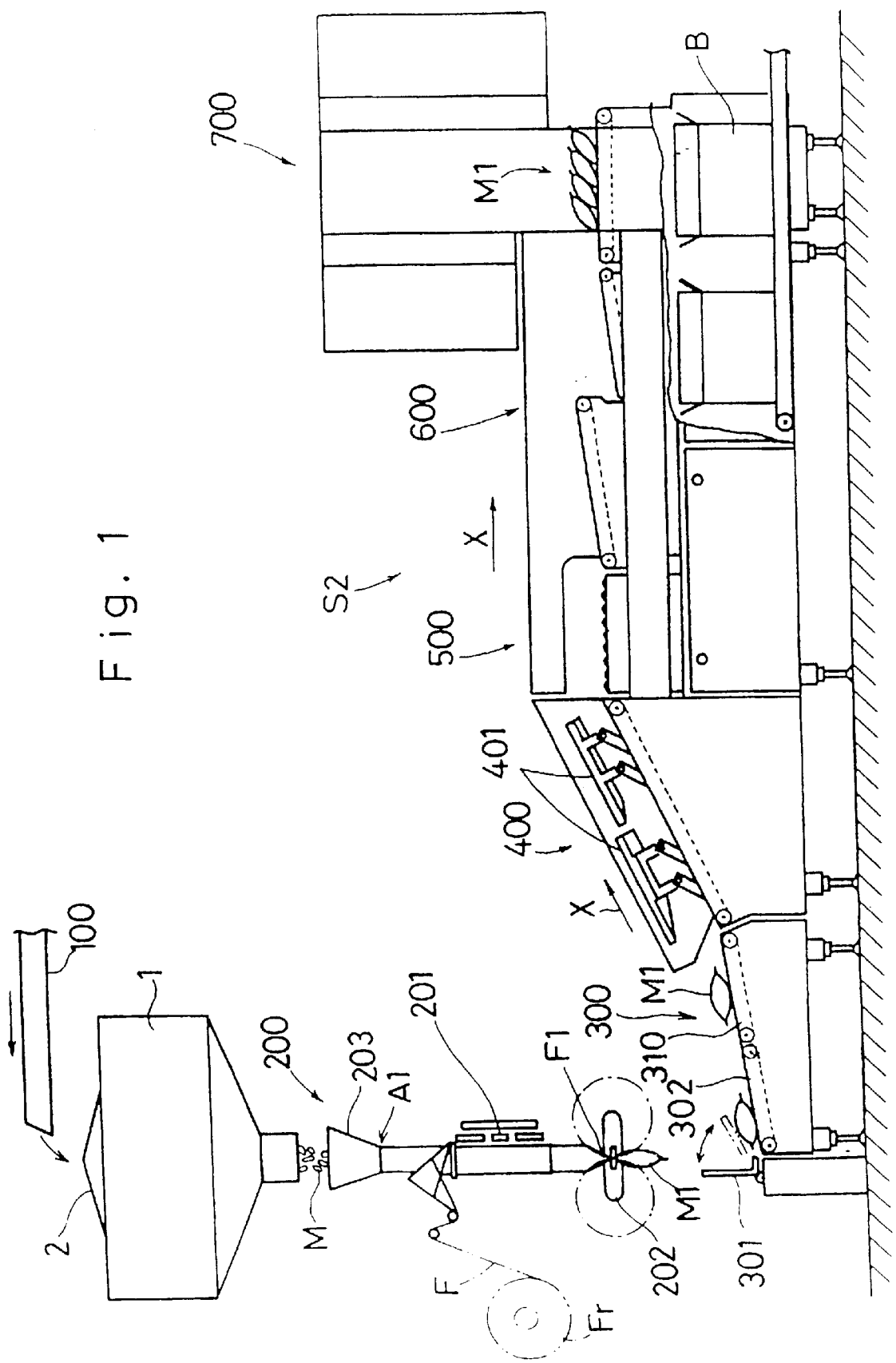
FIG. 1 is a schematic side view of a weighing and packaging system in one embodiment according to the present invention.

In FIG. 1, reference numeral 100 represents a delivery conveyer, reference numeral 1 represents a combination weighing apparatus, reference numeral 200 represents a bagging and packaging machine (a packaging machine), reference numeral 300 represents a weight checker, reference numeral 400 represents a seal checker, and reference numeral 700 represents a boxing machine. The delivery conveyor 100 forces articles M to be weighed to fall by gravity onto the central portion of a dispensing feeder 2 of the combination weighing apparatus 1. Several or many articles M, which are collected and then bagged, will become a product in the later stage.

Figure 2:
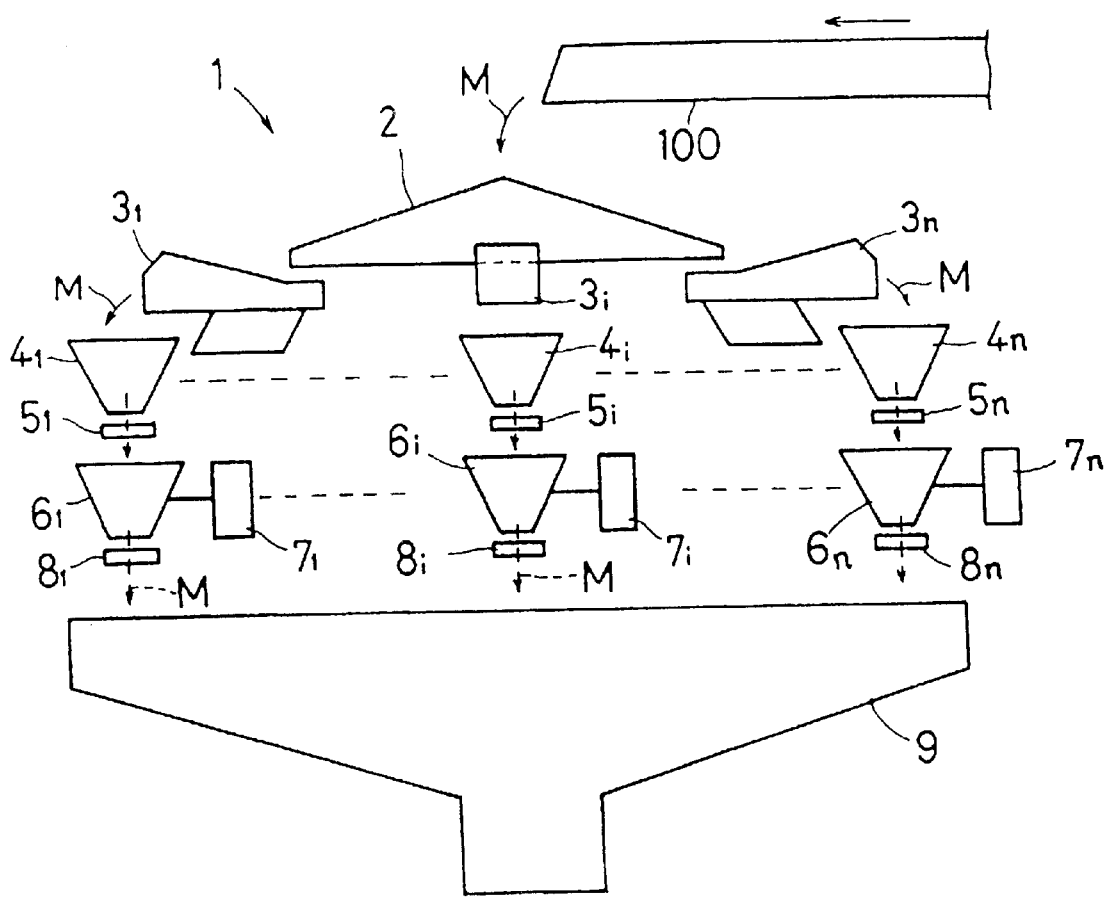
FIG. 2 is a conceptual diagram showing a function of a combination weighing apparatus.

As shown in FIG. 2, the dispensing feeder 2 and a plurality of supply troughs $3i$ are vibrated by a vibrating device, whereby the articles M on the dispensing feeder 2 are supplied to a plurality of pool hoppers $4i$ provided downstream of the supply troughs $3i$, respectively. Each of those pool hoppers $4i$ is provided with a gate $5i$ to temporarily accommodate and store the articles M supplied and received from the corresponding supply trough $3i$. Weighing hoppers $6i$ are disposed downstream of the pool hoppers $4i$, respectively. Each of the weighing hoppers $6i$ is provided with a weighing head including a weight detector $7i$ for detecting the weight of the articles M supplied from the associated pool hopper $4i$ onto the respective weighing hopper $6i$, and with a gate $8i$. Positioned beneath the gates $8i$ is a large collecting and discharging chute 9 and, as will be described later, by combining some of the weights of the articles M detected by the respective weight detectors $7i$, the total weight of the articles M thus combined can attain a target weight or approximate target weight and the articles M are forced to fall downward onto the bagging and packaging machine 200 shown in FIG. 1.

The bagging and packaging machine 200 shown in FIG. 1 is a so-called vertical pillow type bagging machine and is so operable that a sheet-like web of film F drawn from a film roll Fr is fused by a vertical sealer 201 into a tubular form. While the articles M falling by gravity from above are filled in the tubular film F, an upper end (film end) F1 of the film F immediately above the filled articles M is fused (sealed) by an end sealer 202, followed by cutting of the film to thereby package products M1 in a continuous fashion (see, for example, the Japanese Laid-Open Patent Publication NO. 4-128105). Packaged product M1 falls downward, are laid onto a receiving conveyor 302 by a knock-down member 301 and transported by the conveyor 302. The products M1 are then transported from the receiving conveyor 302 to the weight checker 300.

As shown in FIG. 3, the weight checker 300 includes a weight detector 305 such as a load cell for measuring the weight of the product M1 and a conveyor 303 mounted on and supported by the weight detector 305. As shown in FIG. 1, the weight checker 300 weighs and inspects the product M1 while the product M1 is being transported diagonally upward. The product M1 is transported from the weight checker 300 toward the seal checker 400.

The seal checker 400 transports the product M1 transferred from the weight checker 300 diagonally upwardly in a direction of transport X while pressing the product M1 from above by means of a retainer member 401 and, during transport, inspects the presence or absence of a defective seal in the bag and the length of the product M1. A sorting device 500 ejects the product M1 out of the system if the product M1 received from the seal checker 400 is deemed defective and transports the product M1 downstream in the direction of transport X if it is deemed acceptable based on the inspection results. The product M1 is transported toward the downward boxing machine 700 through a transport apparatus comprising the sorting device 500 and a line-up transport device 600. The boxing machine 700 loads products M1 into a cardboard box B.

Next, combination control executed by the combination weighing apparatus will now be described.

Figure 3A:
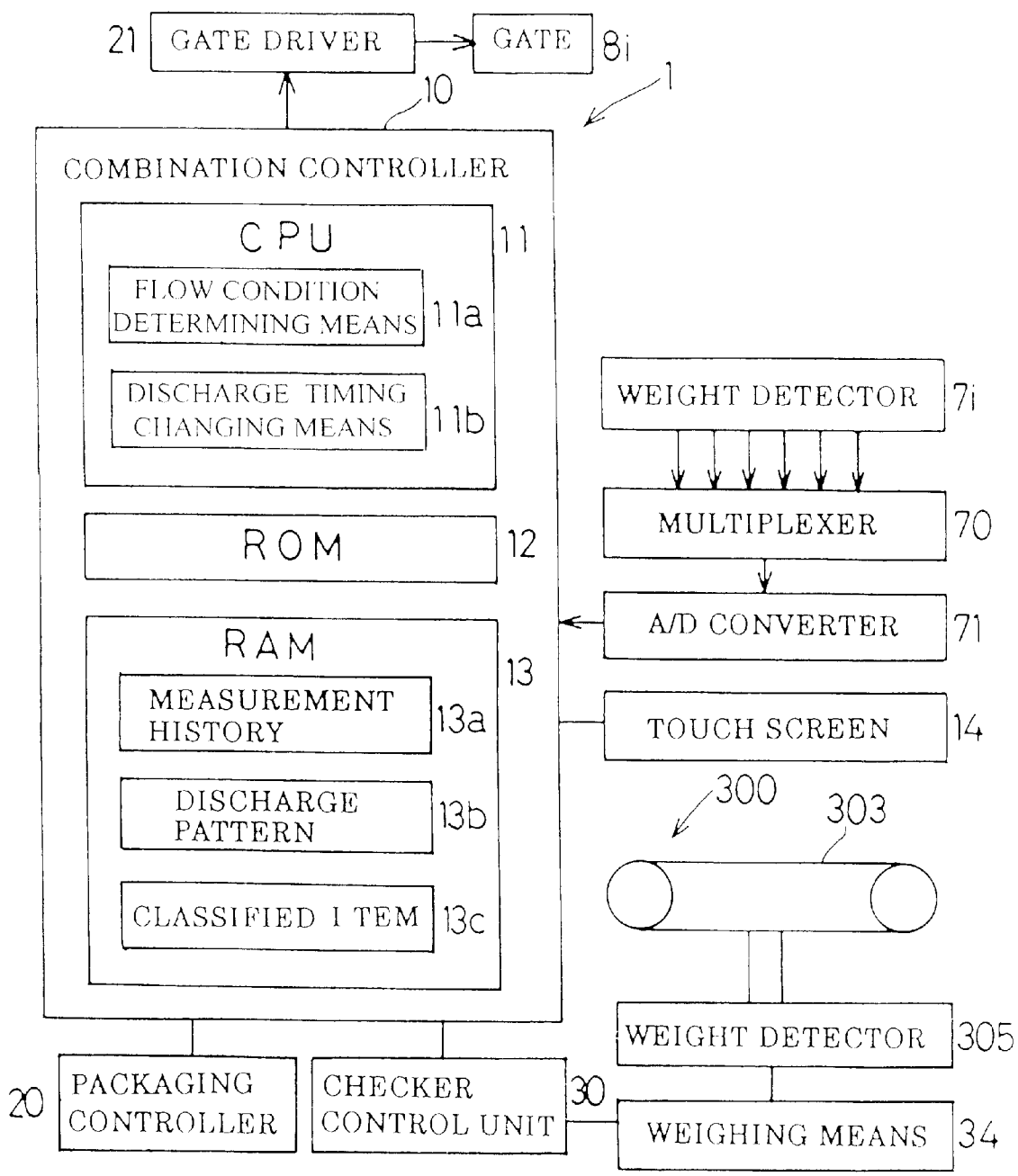
FIG. 3A is a schematic block diagram showing the important portion of the present invention.

As shown in FIG. 3A, each of the weight detectors $7i$ outputs a detected weight to a multiplexer 70. When applied with a predetermined synchronizing signal, the multiplexer 70 outputs each of weight signals to an analog-to-digital (A/D) converter 71. The A/D converter 71 converts each of the weight signals into a weight value, represented by a digital signal, which is subsequently outputted to a combination controller 10.

The combination controller 10 calculates a combination calculated value Wc corresponding to a combination of one or more weight values, compares the combination calculated value Wc with a predetermined combination target value, obtains a combination in which the combination calculated value Wc is equal to or close to the combination target value, and opens the gates $8i$, shown in FIG. 2, corresponding to the combination thus obtained, thereby discharging the articles M in combination from the weighing hoppers 6*i* to the collecting and discharging chute 9.

An important structural feature of the present system will next be described.

As shown in FIG. 3A, the combination controller 10 and a checker control unit 30 both performing a control, are connected with machine component parts, such as an actuator or a motor, through an interface which is not shown therein. The combination controller 10 and the checker control unit 30 are connected with each other through an interface which is not shown therein.

Weighing means 34 is connected with the checker control unit 30. The weighing means 34 converts an output from the weight detector 305 into a weight signal and outputs the weight signal to the checker control unit 30. At the moment the weight signal is stabilized, the checker control unit 30 subtracts a tare weight from the weight signal, calculates a post-discharge measured value Ws. Also, the checker control unit 30 outputs a reject signal to the sorting device 500 (FIG. 1) if the post-discharge measured value Ws is greater or smaller than a predetermined weight. In response to the reject signal, the sorting device 500 rejects the product M1 out of the system. On the other hand, the checker control unit 30 outputs the post-discharge measured value Ws to the combination controller (microcomputer) 10.

The combination controller 10 includes a central processing unit (CPU) 11, a read-only memory (ROM) 12 and a random access memory (RAM) 13. The CPU 11 includes a flow condition determining means 11*a* and a discharge timing changing means 11*b*. The flow condition determining means 11*a* determines whether or not the flow of the articles M is in an abnormal condition, such as the condition in which the articles are likely to be clogged. The discharge timing changing means 11*b* changes the timing for discharging the articles from at least one of hoppers 6*i* based on the flow condition. The RAM 13 includes a measurement history storage 13*a*, a discharge pattern storage 13*b* and a storage 13*c* for storing the discharge pattern for each product type.

As shown in FIG. 3B, the measurement history storage 13*a* stores therein combination calculated values Wc and the post-discharge measured values Ws in the combination while the values are association with each other.

Figure 4A:
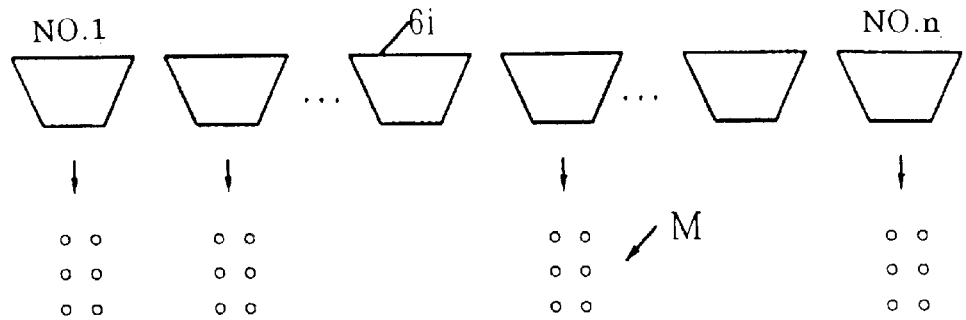
FIGS. 4A to 4C are conceptual diagrams showing discharge patterns.
Figure 4B:
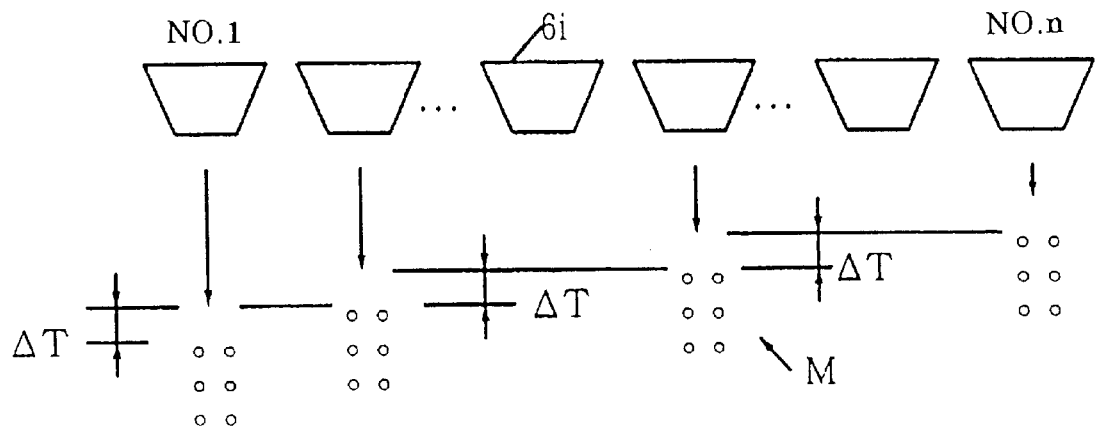
Figure 4C:
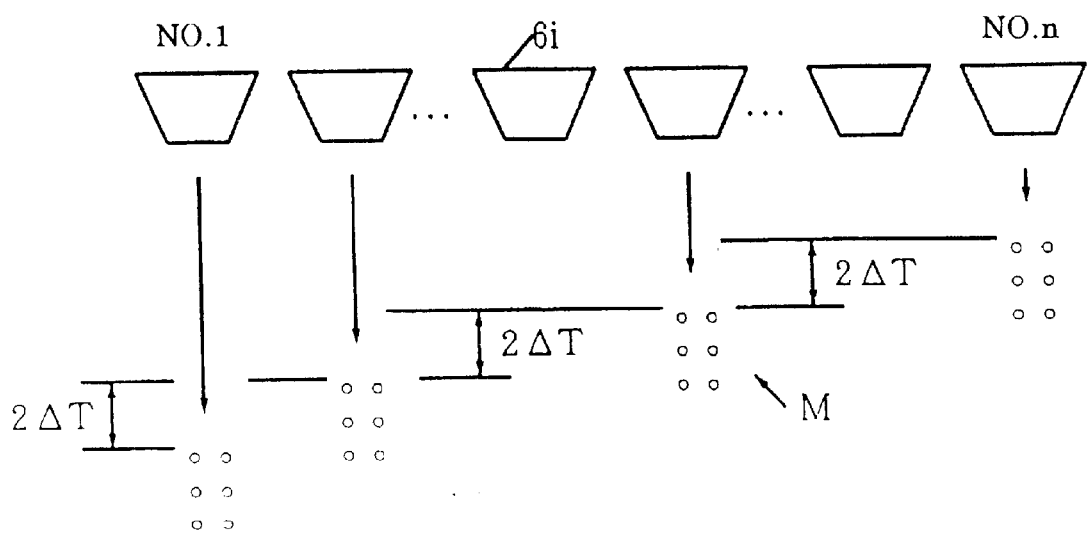

The discharge pattern storage 13*b* stores therein not less than two discharge patterns as shown in FIGS. 4A to 4C. The discharge patterns differ in discharge timing for discharging articles M from the respective hoppers 6*i*, as will be described later.

In a simultaneous discharge pattern (0) shown in FIG. 4A, the gates 8*i* (FIG. 2) of the selected combination of the respective weighing hoppers 6*i* are opened simultaneously and the articles M of the respective hoppers 6*i* are discharged from the collecting and discharging chute 9 to the bagging and packaging machine 200 almost simultaneously.

In a staggered discharge pattern (1) shown in FIG. 4B, the gates 8*i* (FIG. 2) of the selected combination of the respective weighing hoppers 6*i* are opened in a staggered manner, i.e., with a time difference of $\Delta T$ (e.g., 20 msec) and the articles M are sequentially discharged from the weighing hoppers 6*i* in the order of identification numbers from low to high numbers.

In a staggered discharge pattern (2) shown in FIG. 4C, the gates 8*i* (FIG. 2) of the selected combination of the respective weighing hoppers 6*i* are opened in a staggered manner, i.e., with a time difference of $2\Delta T$ (e.g., 40 msec) and the articles M are sequentially discharged from the weighing hoppers 6*i* in the order of the identification numbers from low to high numbers.

The storage 13*c* stores therein the above-stated discharge pattern for each article M or article name (type of the products M1) as shown in FIG. 3C. The stored discharge patterns can be updated therein. The storage 13*c* for storing discharge patterns stores "0" in case of the simultaneous discharge pattern (0), "1" in case of the staggered discharge pattern (1) and "2" in case of the staggered discharge pattern (2) for each product type.

It is to be noted that a packaging controller 20 and a touch screen 14 are connected to the combination controller 10 (FIG. 3) through an interface not shown.

The principle of the detection of abnormality in the flow of products M1 will next be described.

The combination calculated value Wc calculated by the combination weighing apparatus 1 and the post-discharge measured value Ws measured by the weight checker 300 should essentially coincide with each other. Therefore, if it is detected that the post-discharge measured value Ws does not coincide with the combination calculated value Wc (the overweight or underweight of the value Ws is detected), it can be estimated that abnormality occurs to the flow of articles M. The abnormal condition of the flow is considered to be derived from a case where part of the articles M are packaged into the next product M1 (fore-and-aft symptom) or a case where the clogging of articles M are occurring. Here, "a fore-and-aft symptom" is intended to mean a symptom that the sum of the excess and deficiency of the previously weighed product and that of the currently weighed product is equal to or close to zero.

Thus, by detecting the surplus or shortage of the weight of the product M1, it is possible to detect the condition of the flow of the articles M.

Figure 5:
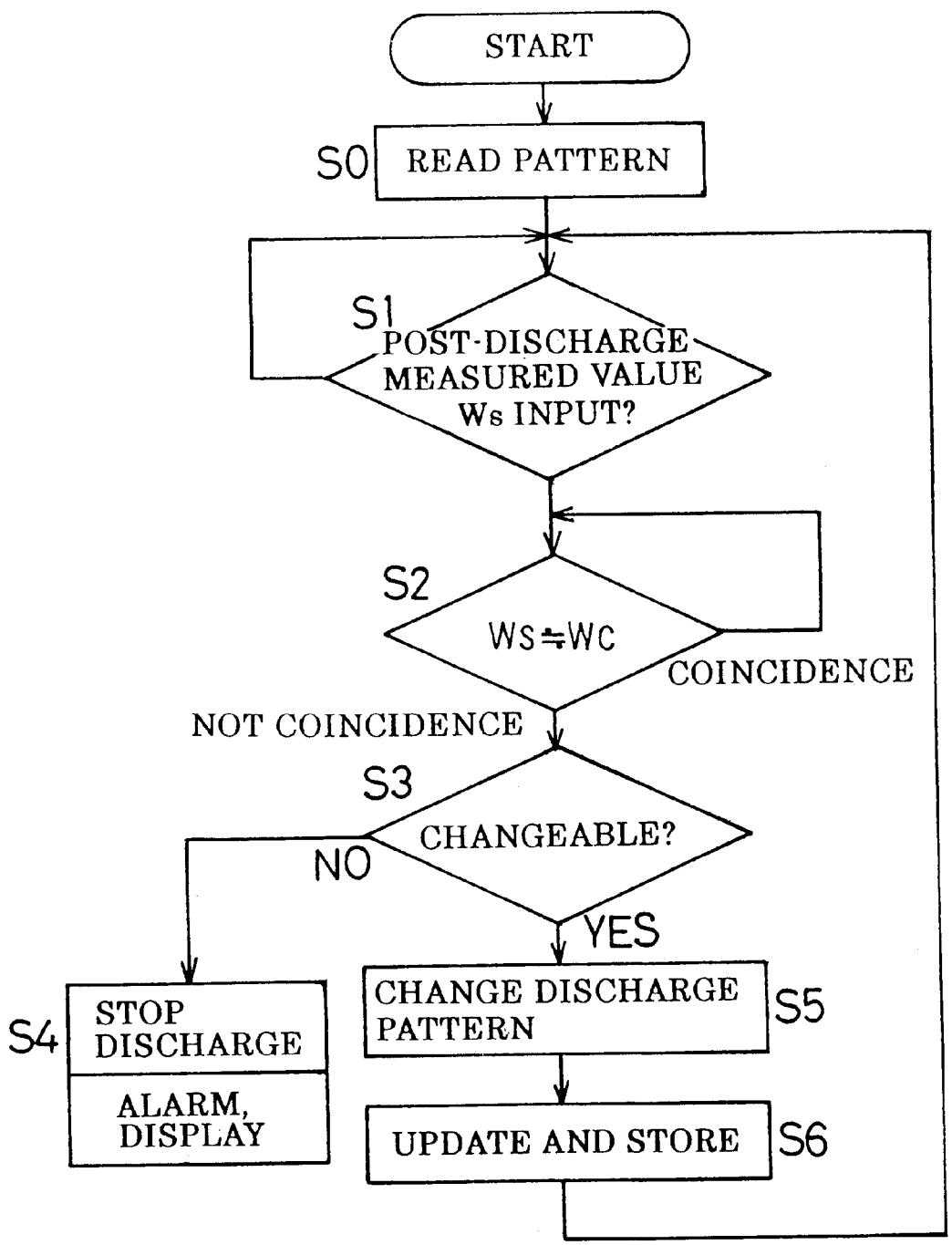
FIG. 5 is a flow chart showing the operation of the present system.

The operation of the present system will be described hereinafter based on the flow chart in FIG. 5.

When the present system starts, a discharge pattern reading means (not shown) of CPU 11 reads a discharge pattern corresponding to the article name from the storage 13*c* storing discharge pattern for each product type in a step S0. In the next step S1, the post-discharge measured value Ws is inputted into the combination controller 10 and the CPU 11 stores the post-discharge weighed value Ws in the measurement history storage 13*a*. The combination calculated value Wc has already been stored in the measurement history storage 13*a* when the combination was selected. In the next step S2, the flow condition determining means 11*a* of the CPU 11 compares the stored combination calculated value Wc with the stored post-discharge weighed value Ws of the same product M1. If the difference between the values Wc and Ws exceeds a predetermined tolerance, the flow condition determining means 11*a* determines that the flow of the articles is in the abnormal condition and then signals it to the discharge timing changing means, and goes to step S3.

In the step S3, the discharge timing changing means 11*b* of the CPU 11 determines whether or not the discharge pattern can be changed.

In this embodiment, three discharge patterns shown in FIGS. 4A to 4C are stored. If the apparatus has already operated in the staggered discharge pattern (2) shown in FIG. 4C, a pattern having a larger time differences among discharge timings of the hoppers than that of the pattern (2) is not stored. As a result, the discharge pattern cannot be changed. In such a case, therefore, a step S4 follows where the CPU 11 stops the discharge of the articles from the combination weighing apparatus 1, activates a warning means and further allows the touch screen 14 to display this status.

In the step S3, if the simultaneous discharge shown in FIG. 4A is carried out, a step S5 follows. In the step S5, the discharge timing changing means 11b of the CPU 11 changes the discharge pattern to the staggered discharge pattern (1) shown in FIG. 4B. That is, the simultaneous discharge state is automatically changed to a staggered discharge state. In response to the change of the pattern, the CPU 11 controls gate driving means 21 (FIG. 3A) to thereby adjust the opening/closing timing of the gates 8i of the weighing hoppers 6i.

Likewise, in the step S3, if the articles M are discharged in the staggered discharge pattern (1) shown in FIG. 4B, a step S5 follows. In the step S5, the discharge pattern is changed to the staggered discharge pattern (2) shown in FIG. 4C.

As can be seen from the above, according to the present system, the discharge timing for discharging the articles M from the weighing hopper 6i is adapted to be automatically changed for at least one of hoppers in accordance with the condition of the flow of the articles M. Thus, the articles M flow smoothly without interfering with one another and it is, therefore, possible to prevent the complete clogging of the articles M in the chute 203 or the like of the packaging machine 200.

In the next step S6, the CPU 11 updates the discharge pattern thus automatically changed in accordance with the article name and stores the updated pattern in the storage 13c storing discharge pattern for each product type. Namely, a newly adopted discharge pattern number for the article name is stored in the storage 13c storing discharge pattern for each product.

Next, a modification relating to the change of discharge patterns (discharge timing) will be described.

Figure 6A:
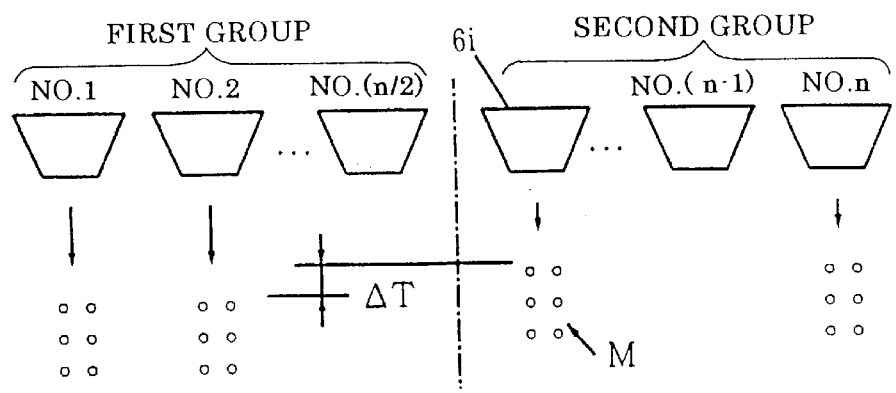
FIGS. 6A and 6B are conceptual diagrams showing other discharge patterns.

In the above-stated embodiment, time differences among discharge timings of the hoppers are changed. It is also possible to change the number of weighing hoppers 6i having time differences. In that case, a staggered discharge pattern (3) shown in FIG. 6A as well as the discharge patterns shown in FIGS. 4A to 4C is stored, in advance, in the discharge pattern storage 13b in the RAM 13. The discharge pattern storage 13b stores, as the weighing hoppers 6i having time differences, the identification numbers of the weighing hoppers belonging to the first group and those belonging to the second group as well as a time difference ΔT. In the staggered discharge pattern (3), among the weighing hoppers 6i in the selected combination, the articles M of those belonging to the first group are first discharged and after ΔT seconds, the articles M of those belonging to the second group are discharged in a staggered manner.

It is to be noted that the weighing hoppers 6i having time differences may be divided into three or more groups. Further, the selected combination of the weighing hoppers 6i may be divided into two or more groups when being discharged without registering the groups thereof in advance.

Figure 6B:
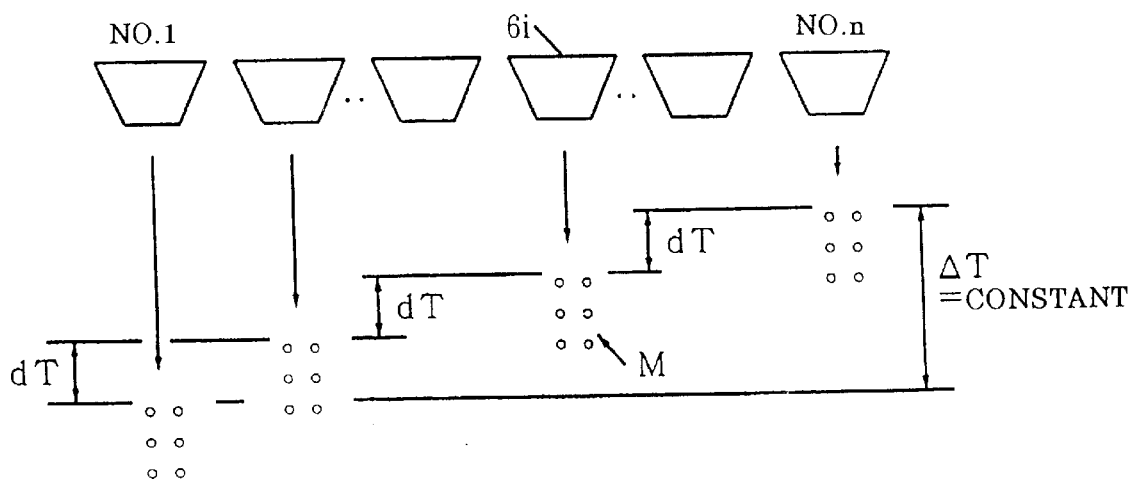

Moreover, in the above-stated embodiment, the time difference ΔT between the weighing hoppers 6i from which the articles M are discharged previously and those from which the articles M are discharged subsequently is fixed. In the present invention, the time difference ΔT between the weighing hoppers 6i from which the articles M are discharged first and those from which the articles M are discharged finally may be fixed as shown in FIG. 6B. In that case, the time difference dT between the respective weighing hoppers 6i is obtained based on the following equation (1):

$$dT = \Delta T/(m-1) \tag{1}$$

In the equation (1), m is the number of the weighing hoppers 6i in the selected combination.

Additionally, in the above-stated embodiment, staggered discharge patterns are stored in advance and one pattern is selected from among the stored patterns. In the present invention, it is also possible that a time difference ΔT is set at a small value, the integral multiple of the time difference ΔT is obtained and the types of the discharge patterns are thereby increased.

Next, description will be given to a modification relating to determination as to whether or not the simultaneous discharge can be changed to the staggered discharge and whether the time difference can be increased (changed).

First, in this modification, a necessary processing capability storage 13d shown in FIG. 7A and a storage 13e for storing the processing capability for each pattern shown in FIG. 7B are additionally provided in the RAM 13 (FIG. 3A). The necessary processing capability storage 13d stores necessary processing capability for each product M1. The processing capability storage 13e stores maximum processing capability for each discharge pattern. If a discharge pattern is changed and a discharge pattern (discharge timing) to be newly adopted is selected, the discharge timing changing means 11b of the CPU 11 reads the maximum processing capability for the selected pattern from the pattern basis processing capability storage 13e and also reads the necessary processing capability required for the corresponding product M1 from the necessary processing capability storage 13d, followed by the comparison of the both capabilities. As a result of the comparison, if the maximum processing capability is lower than the necessary processing capability, the CPU 11 does not change the discharge pattern.

At this time, if staggered discharge is conducted, there is no avoiding lengthening a time cycle from weighing and discharging to packaging. On the other hand, the system requires predetermined processing capability for each product M1.

In this modification, by contrast, if the maximum processing capability of the combination weighing apparatus 1 is equal to or lower than the necessary processing capability, the discharge pattern is not changed to the staggered discharge pattern or the time difference is not increased. This can, therefore, prevent processing capability from greatly deteriorating.

Meanwhile, in the above-stated embodiment, the CPU 11 of the combination weighing apparatus 1 itself determines whether or not it is necessary to change discharge to staggered discharge. In the present invention, it is also possible that the determination is not made by the combination weighing apparatus 1 and discharge timing is automatically changed in response to a command from an apparatus different from the combination weighing apparatus 1.

Figure 8:
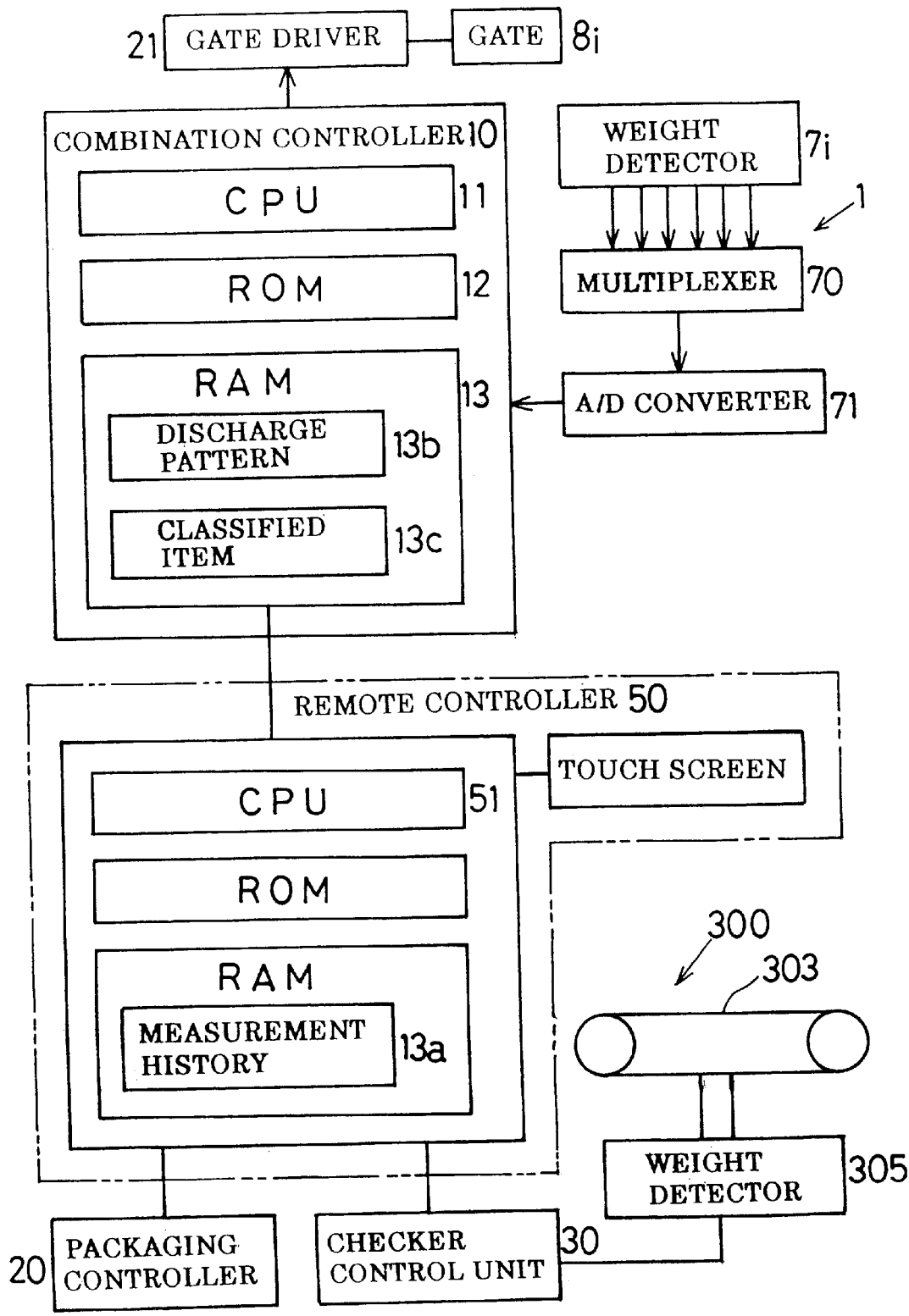
FIG. 8 is a schematic block diagram showing a modification of the system.

As show in FIG. 8, for example, a remote controller 50 is additionally provided. A combination calculated value Wc and a post-discharge weighed value Ws are inputted from the combination controller 10 and the checker control unit 30 into the remote controller 50, to thereby allow a CPU 51 in the remote controller 50 to determine whether to conduct staggered discharge. In that case, the remote controller 50 outputs a change command to change discharge timings to the combination controller 10.

The preferred embodiments have been described so far with reference to the drawings. However, those skilled in the art will readily conceive various changes and modifications within the framework of obviousness upon the reading of the specification herein presented of the present invention. Accordingly, such changes and modifications are, unless they depart from the scope of the present invention as defined by the claims annexed hereto, to be construed as included therein.

What is claimed is:

1. A combination weighing apparatus comprising:
   a plurality of weighing hoppers; and
   a collector for selecting a combination of some of the weighing hoppers accommodating therein articles that have been supplied thereto, which combination results in a combination calculated value of measured weights of the articles contained in some of the weighing hoppers forming the combination, falling within a predetermined combination tolerance, and for subsequently discharging the articles in the selected weighing hoppers;
   wherein a timing for discharging the articles from the weighing hopper is adapted to be automatically changed for at least one of the weighing hoppers based on a comparison of the combination calculated value with a post-discharge measured value measured downstream of the combination weighing apparatus so that virtually no clogging of the articles occurs.

2. The combination weighing apparatus as claimed in claim 1, wherein said change of discharge timing is made by changing a state in which the articles are discharged from the respective weighing hoppers almost simultaneously to a state in which the articles are discharged from part of or all of the weighing hoppers in a staggered manner.

3. The combination weighing apparatus as claimed in claim 1, wherein said change of discharge timing is made by changing a time difference with which the articles are discharged from part of or all of the weighing hoppers in a staggered manner.

4. The combination weighing apparatus as claimed in claim 1, wherein said change of discharge timing is made by changing the number of weighing hoppers with a time difference in a state in which the articles are discharged from part of or all of the weighing hoppers in a staggered manner.

5. The combination weighing apparatus as claimed in claim 1, comprising a storage for storing said automatically changed discharge timing for each article or product type, the discharge timing may be updated.

6. The combination weighing apparatus as claimed in claim 1, wherein said change of discharge timing is made by presetting and storing not less than two patterns for the discharge timing for discharging the articles from said weighing hoppers, and by selecting one pattern from among the not less than two patterns preset and stored.

7. The combination weighing apparatus as claimed in claim 1, wherein a processing capability for changed and newly adopted discharge timing is compared with a necessary processing capability, and said change of discharge timing is not made is said processing capability is lower than the necessary processing capability.

8. A combination weighing apparatus comprising:
   a plurality of weighing hoppers; and
   a collector for selecting a combination of some of the weighing hoppers accommodating therein articles that have been supplied thereto, which combination results in a combination calculated value of measured weights of the articles contained in some of the weighing hoppers forming the combination, falling within a predetermined combination tolerance, and for subsequently discharging the articles in the selected weighing hoppers;
   wherein a timing for discharging the articles from said weighing hoppers is adapted to be automatically changed for at least one of weighing hoppers in accordance with a command from an apparatus different from the combination weighing apparatus, which command is outputted based on a comparison of the combination calculated value with a post-discharge measured value measured downstream of the combination weighing apparatus, so that virtually no clogging of the articles occurs.

9. The combination weighing apparatus as claimed in claim 8, wherein said change of discharge timing is made by changing a state in which the articles are discharged from the respective weighing hoppers almost simultaneously to a state in which the articles are discharged from part of or all of the hoppers in a staggered manner.

10. The combination weighing apparatus as claimed in claim 8, wherein said change of discharge timing is made by changing a time difference with which the articles are discharged from part of or all of the weighing hoppers in a staggered manner.

11. The combination weighing apparatus as claimed in claim 8, wherein said change of discharge timing is made by changing the number of weighing hoppers with a time difference in a state in which the articles are discharged from pat of or all of the weighing hoppers in a staggered manner.

12. The combination weighing apparatus as claimed in claim 8, comprising a storage for storing said automatically changed discharge timing for each article or product type, the discharge timing maybe updated.

13. The combination weighing apparatus as claimed in claim 8, wherein said change of discharge timing is made by presetting and storing not less than two patterns form the discharge timing for discharging the articles from said weighing hoppers, and by selecting one pattern from among the not less than two patterns preset and stored.

14. The combination weighing apparatus as claimed in claim 8, wherein a processing capability for changed and newly adopted discharge timing is compared with a necessary processing capability, and said change of discharge timing is not made if said processing capability is lower than the necessary processing capability.

* * * * *